Nov. 4, 1952 C. E. G. BAILEY 2,617,040

ELECTRICAL OSCILLATOR CIRCUIT ARRANGEMENT

Filed Dec. 10, 1947

INVENTOR.
CHRISTOPHER EDMUND GERVASE BAILEY.
BY Fred M Vogel
AGENT.

Patented Nov. 4, 1952 2,617,040

UNITED STATES PATENT OFFICE 2,617,040

ELECTRICAL OSCILLATOR CIRCUIT ARRANGEMENT

Christopher Edmund Gervase Bailey, London, England, assignor to The Hartford National Bank and Trust Company, Hartford, Conn., as trustee Application December 10, 1947, Serial No. 790,805
In Great Britain February 22, 1945

6 Claims. (Cl. 250—36)

This invention relates to electrical oscillator circuit-arrangements.

According to the invention in an electrical oscillator circuit-arrangement the oscillator is synchronised over a certain frequency range with the use of synchronising pulses and on the disappearance of the synchronising pulses the oscillator reverts to its natural frequency only slowly. The effect of this sluggish reversion is that the circuit has the property of "remembering" the synchronising frequency after the synchronising pulses have disappeared whereas in the conventional synchronising arrangements the oscillator reverts to its natural frequency within the space of one cycle after the disappearance of the synchronising signal.

The synchronising pulses may be derived from a synchronising wave with the use for example of a multivibrator or flip-flop circuit included in the oscillator circuit-arrangement.

According to one embodiment of the invention part of the output energy of the oscillator is fed back in the form of square-topped pulses to a coincidence gate valve to which square-topped synchronising pulses are also applied. The square-topped pulses fed back from the oscillator may be derived directly from the oscillator if the oscillator is realised for example as a relaxation oscillator or may be provided indirectly with the interposition of a suitable limiter device. The coincidence valve is so biased that it gives an output only when both the synchronising input and that part of the oscillator output which is fed back to the coincidence gate valve are at their positive peaks such that the valve gives no output in the absence of the synchronising input. The input pulses have a width which is narrower than the gaps between the flat tops of the fed-back oscillator output pulses. The output from the coincidence valve is fed to a rectifying valve which reproduces negative pulses which are applied to a low-pass filter from which their average valve emerges and is utilised to provide the frequency control of the oscillator. This average value voltage may be applied as a bias to an electrode of the oscillator or to an electrode of a reactor valve of known type, the potential applied to the electrode determining the frequency of oscillation of the oscillator; for instance a negative potential increasing the frequency.

Figure 1:
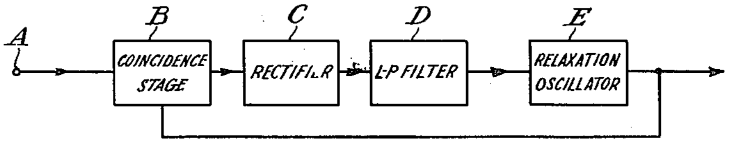
Figure 2:
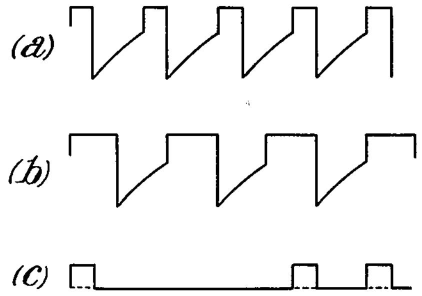
Figure 3:
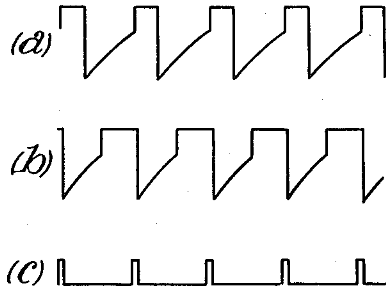
Figure 4:
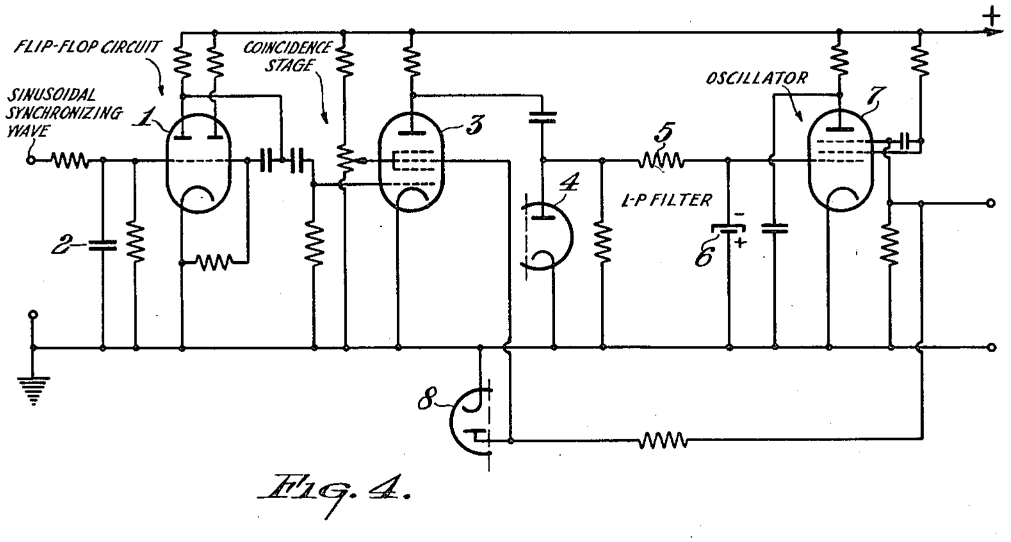

The invention will now be described more fully with reference to the accompanying drawing in which:

Figure 1 is a block circuit diagram of a circuit-arrangement according to the invention, Figures 2 and 3 illustrate waveforms with reference to which the action of the circuit-arrangement according to the invention will be explained hereinafter, and Figure 4 is a schematic representation of a circuit-arrangement according to Figure 1.

Referring first to Figure 1, square topped synchronising pulses are fed in at (*a*) to a coincidence stage B which also receives square topped pulses from the output of an oscillator E, realised as a relaxation oscillator. The coincidence stage B is so arranged that it gives an output only when the synchronising pulses and the fed back part of the oscillator output are both at a positive peak. The stage B output is applied to a rectifier C which gives negative pulses which are passed to a low-pass filter D, and finally the output from the filter D is applied to the frequency-controlling electrode of the relaxation oscillator E.

Let it be assumed that the natural frequency of the oscillator E with zero bias on the frequency-controlling electrode is less than the frequency of the synchronising pulses. When the synchronising pulses are applied, two sets of pulses will be applied to the coincidence stage B, these pulses having the form and time relationship shown in Figure 2 where (*a*) represents the voltage of the synchronising pulses and (*b*) the voltage of the oscillator output pulses. Positive peaks of the two sets of pulses will frequently overlap in time so that the number of current pulses will occur in the coincidence stage output as shown in Figure 2 (*c*). These current pulses from the coincidence stage produce a high voltage bias level on the frequency-controlling electrodes of the oscillator E. Consequently, the frequency of the oscillator E will increase until this is equal to the frequency of the synchronising pulses. Figure 3, where (*a*), (*b*), and (*c*) have the same significance as in Figure 2, shows typical conditions for equilibrium. The positive peaks of the output pulses (*b*) from the oscillator E very nearly occupy the gaps between the positive peaks of the synchronising pulses (*a*), but each trailing edge of the pulses (*b*) overlaps slightly the leading edge of a synchronising pulse (*a*), the extent of overlap being such as to give a coincidence stage output (*c*) resulting in the correct bias of the frequency-controlling electrode in order to maintain synchronism. If the synchronising pulses vanish completely, the decay of the oscillator frequency from the synchronising frequency to its own natural frequency with zero-bias takes place slowly due to the time delay introduced by the low-pass filter. The rate of decay follows a roughly exponential law and within limits may be made as sluggish as desired by increasing the time constant of the filter.

It will now be clear how synchronism is held over a range of synchronising frequencies, once synchronism has been attained. Assuming synchronism as in Figure 3, then if the synchronising frequency increases, the leading edge of a synchronism pulse will overlap further the trailing edge of an output pulse, the bias applied to the frequency-controlling electrode will increase and the frequency of the oscillator E will increase accordingly. Similarly, if the synchronising frequency decreases, there will be less overlap, less bias on the frequency-controlling electrode and the frequency of the oscillator E will decrease accordingly. The long time constant of the low-pass filter involves a sluggishness in the response of the oscillator frequency when the synchronising frequency is changed. Consequently, there is a limit to the rate of change of the frequency of the synchronising pulses which can be tolerated, because, for example, if it were lowered too rapidly the trailing edge of a synchronising pulse would begin to overlap the leading edge of an oscillator output pulse, so that the oscillator frequency would increase instead of decreasing and synchronism would be lost completely.

In the circuit of Figure 4, a sinusoidal synchronising wave is assumed and the square topped synchronising pulses are derived by means of a valve 1 arranged as a flip-flop of the modified Schmitt type. In this flip-flop circuit a condenser 2 reduces a tendency to spontaneous oscillation. The square-topped output from the valve 1 is applied to coincidence valve 3, the output of which is applied, by way of a rectifying valve 4 and a low-pass filter constituted by a resistance 5 and a condenser 6, to the oscillator 7. Part of the square-topped output of the oscillator 7 is fed back to the third grid of the coincidence valve 3. The diode 8 serves the purpose of keeping flat the tops of the square-topped output fed back to the coincidence valve 3. The diodes 8 and the rectifier 4 can conveniently be accommodated in a single housing as a double-diode, as is illustrated diagrammatically in the drawing.

Among various uses to which a frequency "remembering" circuit according to the present invention can be put, the following may be mentioned:

(*a*) In television, to maintain synchronism if the signal fails.

(*b*) For carrier restoration circuits operated by the residual carrier which may disappear with selective fading.

(*c*) In radar, in order to bracket an objective the velocity of approach or recession of which has been estimated.

These applications are given purely by way of example, as the invention can be utilized whenever it is desired to provide that a synchronised oscillator returns to its natural frequency only slowly after the synchronising voltage has been cut off.

I claim:

1. An oscillation generating system comprising an oscillator having a given operating frequency, frequency varying means coupled to said oscillator and responsive to a control voltage, means to derive from the output of said oscillator a wave having a square-shaped top portion and of the same frequency as said operating frequency, a source of square-shaped synchronizing pulses having a width which is narrower than the spacing between successive top portions of said wave, a coincidence circuit, means to apply said wave and said synchronizing pulses as an input to said coincidence circuit, said coincidence circuit being arranged to develop output pulses solely during the time period in which said synchronizing pulses overlap the top portion of said wave, a low pass filter coupled to the output of said coincidence circuit to develop a control voltage proportional to the average value of the output pulses, and means to apply said control voltage to said frequency varying means.

2. An oscillation generating system comprising a relaxation oscillator for producing a square wave, frequency varying means coupled to said oscillator and responsive to a control voltage, a source of square-shaped synchronizing pulses having a width which is narrower than the spacing between successive impulses in said square wave, a coincidence circuit, means to apply said wave and said synchronizing pulses as an input to said coincidence circuit, said coincidence circuit being arranged to develop output pulses solely during the time period in which said synchronizing pulses overlap the impulses of said square wave, a rectifier and a low pass filter coupled to the output of said coincidence circuit to develop a unidirectional control voltage proportional to the average value of the output pulses, and means to apply said control voltage to said frequency varying means.

3. An arrangement, as set forth in claim 2, wherein said output pulses from said coincidence circuit are applied to said filter through a half-wave rectifier.

4. An arrangement, as set forth in claim 2, wherein said relaxation oscillator includes an electron discharge device and said frequency varying means consists of a control electrode of said discharge device, said control voltage being applied to said control electrode.

5. An arrangement, as set forth in claim 2, wherein the wave from said relaxation oscillator is fed to the input of said coincidence circuit through a half-wave rectifier.

6. An oscillation generating system comprising an oscillator, frequency varying reactance tube means coupled to said oscillator and responsive to a control voltage, limiter means coupled to said oscillator to derive therefrom a wave having a square-shaped top portion, a multivibrator for producing synchronizing pulses having a width which is narrower than the spacing between successive top portions of said wave, a coincidence circuit, means to apply said wave and said synchronizing pulses as an input to said coincidence circuit, said coincidence circuit being arranged to develop output pulses solely during the time period in which said synchronizing pulses overlap the top portions of said wave, a rectifier and a low pass filter coupled to the output of said coincidence circuit to develop a unidirectional control voltage proportional to the average value of the output pulses, and means to apply said control voltage to said reactance tube means.

CHRISTOPHER EDMUND GERVASE BAILEY.

REFERENCES CITED

The following references are of record in the file of this patent:

UNITED STATES PATENTS

| Number | Name | Date |
|---|---|---|
| 2,141,343 | Campbell | Dec. 27, 1938 |
| 2,201,978 | Bedford | May 28, 1940 |
| 2,209,507 | Campbell | July 30, 1940 |
| 2,277,000 | Bingley | Mar. 17, 1942 |
| 2,358,545 | Wendt | Sept. 19, 1944 |
| 2,480,599 | Oxford | Aug. 30, 1949 |